(12) United States Patent
Jia

(10) Patent No.: US 12,185,118 B2
(45) Date of Patent: Dec. 31, 2024

(54) DUAL CONNECTIVITY CELL SELECTION WITH DYNAMIC SPECTRUM SHARING

(71) Applicant: AT&T Intellectual Property I, L.P., Atlanta, GA (US)

(72) Inventor: Yupeng Jia, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 52 days.

(21) Appl. No.: 17/381,715

(22) Filed: Jul. 21, 2021

(65) Prior Publication Data

US 2023/0021592 A1    Jan. 26, 2023

(51) Int. Cl.
| | | |
|---|---|---|
| *H04W 72/04* | (2023.01) | |
| *H04B 17/318* | (2015.01) | |
| *H04L 27/00* | (2006.01) | |
| *H04L 27/26* | (2006.01) | |
| *H04W 16/14* | (2009.01) | |
| *H04W 24/10* | (2009.01) | |
| *H04W 36/06* | (2009.01) | |
| *H04W 72/20* | (2023.01) | |
| *H04W 72/30* | (2023.01) | |
| *H04W 72/50* | (2023.01) | |
| *H04W 74/00* | (2009.01) | |
| *H04W 76/15* | (2018.01) | |
| *H04W 76/18* | (2018.01) | |

(52) U.S. Cl.
CPC .......... *H04W 16/14* (2013.01); *H04W 72/20* (2023.01); *H04W 76/15* (2018.02); *H04W 76/18* (2018.02)

(58) Field of Classification Search
CPC . H04W 72/0453; H04W 16/14; H04W 76/11; H04W 26/0804; H04W 76/34; H04W 72/04; H04W 72/863; H04L 5/001; H04L 41/0803; H04M 1/0202
USPC ........................................ 455/435.2; 370/331
See application file for complete search history.

(56) References Cited

U.S. PATENT DOCUMENTS

| | | | |
|---|---|---|---|
| 2010/0195621 A1* | 8/2010 | Kekki | H04W 48/17 370/332 |
| 2010/0234037 A1* | 9/2010 | Terry | H04L 5/003 455/450 |
| 2017/0034831 A1* | 2/2017 | Yerramalli | H04W 74/0808 |
| 2019/0274097 A1* | 9/2019 | Hietalahti | H04W 52/0212 |
| 2019/0280795 A1* | 9/2019 | Kuipers | H04L 5/14 |
| 2020/0350936 A1* | 11/2020 | Hong | H04W 48/02 |
| 2021/0051592 A1* | 2/2021 | Wang | H04L 5/001 |
| 2021/0204309 A1* | 7/2021 | Babaei | H04W 36/0061 |

(Continued)

*Primary Examiner* — Kibrom T Hailu
*Assistant Examiner* — Jason A Harley

(57) ABSTRACT

The disclosed technology is directed towards avoiding a misconfiguration that uses a Long Term Evolution (LTE) and new radio dynamic spectrum sharing (DSS) carrier as an LTE carrier and new radio primary secondary cell carrier concurrently for a dual connectivity mobile device. Network equipment can detect the misconfiguration and prevent its usage, or if already configured, deconfigure the LTE DSS secondary cell during setup of a dual connectivity mobile device. Alternatively a dual connectivity mobile device can detect the misconfiguration and notify the network to terminate one of the carriers. Information regarding the misconfiguration can be saved in the mobile device to proactively avoid the dual misconfiguration going forward. Such information can be communicated to other mobile devices, as well as the network.

19 Claims, 12 Drawing Sheets

(56) References Cited

U.S. PATENT DOCUMENTS

2021/0385900 A1* 12/2021 Hori ..................... H04W 76/34
2022/0167215 A1*  5/2022 Hu ..................... H04W 36/0016
2022/0191675 A1*  6/2022 Mukherjee .......... H04W 56/001
2022/0338258 A1* 10/2022 Xie ................... H04W 72/0453

* cited by examiner

DUAL CONNECTIVITY CELL SELECTION WITH DYNAMIC SPECTRUM SHARING

TECHNICAL FIELD

The subject application relates to wireless communications systems in general, and more particularly to dynamic spectrum sharing (DSS) in new radio (NR) including Fifth Generation (5G) cellular wireless communications systems and/or other next generation networks.

BACKGROUND

In dynamic spectrum sharing (DSS) deployments, Fourth Generation (4G) Long Term Evolution (LTE) and Fifth Generation (5G) New Radio (NR) share the same spectrum. For example, a DSS carrier can be used on user equipment (UE) either as an LTE secondary cell (SCell) carrier for LTE downlink carrier aggregation, or a primary secondary cell (PSCell) 5G NR carrier in an LTE-NR dual connectivity configuration.

In a scenario in which the DSS carrier is simultaneously configured for LTE carrier aggregation and a new radio PSCell, field testing has observed issues including interference problems, throughput degradation and an increased number of call drops. In general, the LTE cell can collide with the NR PSCell on the same frequency carrier in an E-UTRAN New Radio—Dual Connectivity (ENDC) band combination.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
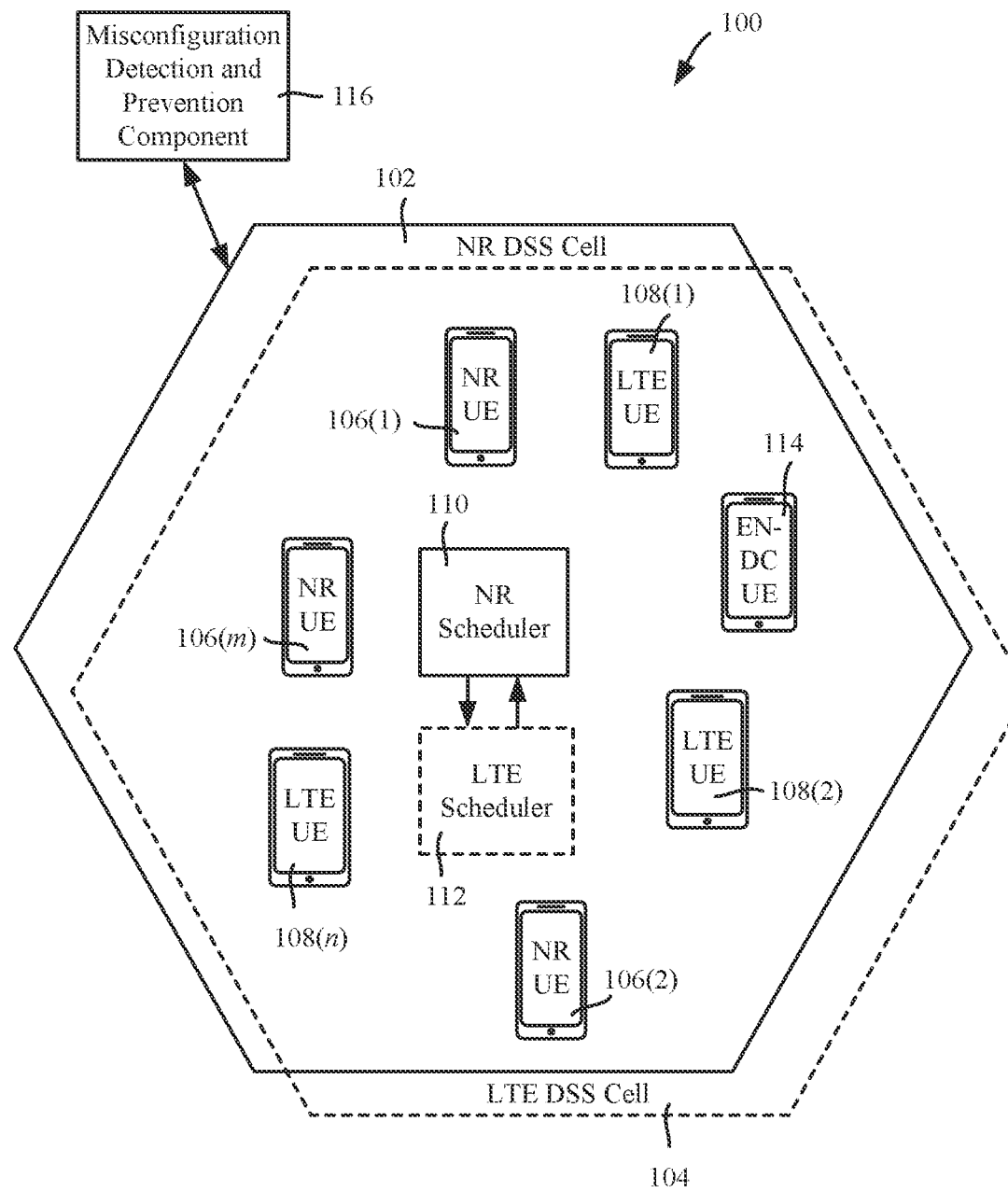
FIG. 1 is a block diagram illustrating an example wireless communication system configured for dynamic spectrum sharing, in accordance with various aspects and embodiments of the subject disclosure.

The technology described herein is generally directed towards avoiding a scenario in which the same dynamic spectrum sharing (DSS) carrier is configured concurrently as an LTE (Long Term Evolution) carrier and a new radio primary secondary cell (NR PSCell) carrier for a mobile device/user equipment (UE). As will be understood, the technology operates to identify any deployment scenarios and band combinations that configure ENDC and LTE carrier aggregation (CA) at the same time using the same DSS cell as the LTE carrier and the NR PSCell carrier, and remedy such configurations.

In one alternative, such a configuration can be blocked from the network perspective. For example, a network can create a backlist of band combinations that include ENDC and LTE CA at the same time using the same DSS cell, and do not configure (or if already configured, drop) the LTE carrier from such ENDC band combinations. When a UE is not configured for the ENDC mode of operation, the UE can still benefit from using this carrier as an LTE cell.

In another alternative, such a configuration can be blocked/avoided from the UE perspective, such as by detecting the misconfiguration in ENDC band combinations and dropping (terminating) the DSS LTE CA carrier, or dropping the NR PSCell carrier. Further, reinforced learning can be used to train artificial intelligence models or other techniques used to "fingerprint" such a cell as a DSS LTE/NR dual mode network, to prevent the UE from again using the same DSS carrier as LTE and NR concurrently on the UE, that is, taking action beforehand to eliminate the subsequent need to detect and drop the LTE or NR carrier.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a new radio (NR, e.g., 5G) cell 102 (solid line block) and LTE cell 104 (dashed line block) each including respective network equipment are configured for dynamic spectrum sharing (DSS) as described herein. Some number 106(1)-106(m) of NR user equipment (UE)/mobile devices are communicating via the network equipment of the NR cell 102, while some number 108(1)-108(n) of LTE UEs are communicating via the network equipment of the LTE cell 104. A NR scheduler 110 and an LTE scheduler 112 are used to facilitate/coordinate sharing of the spectrum by the network components and the various mobile devices.

One depicted mobile device 114 is operating in a dual connectivity (ENDC) mode. As described herein, a misconfiguration detection and prevention component 116 operates to avoid the LTE-NR DSS carrier from being used as an LTE carrier and NR PSCell carrier concurrently for the ENDC mobile device 114, as well as any other devices in the DSS cells' coverage area. This avoids the collision that can occur when the mobile device 114 is configured with the same LTE-NR DSS cell as the LTE SCell and NR PSCell It should be noted that while in FIG. 1 the misconfiguration detection and prevention component 116 is shown as being coupled to the cells (their network equipment), a similar misconfiguration detection and prevention component can be incorporated into the user equipment/mobile devices.

Figure 2:
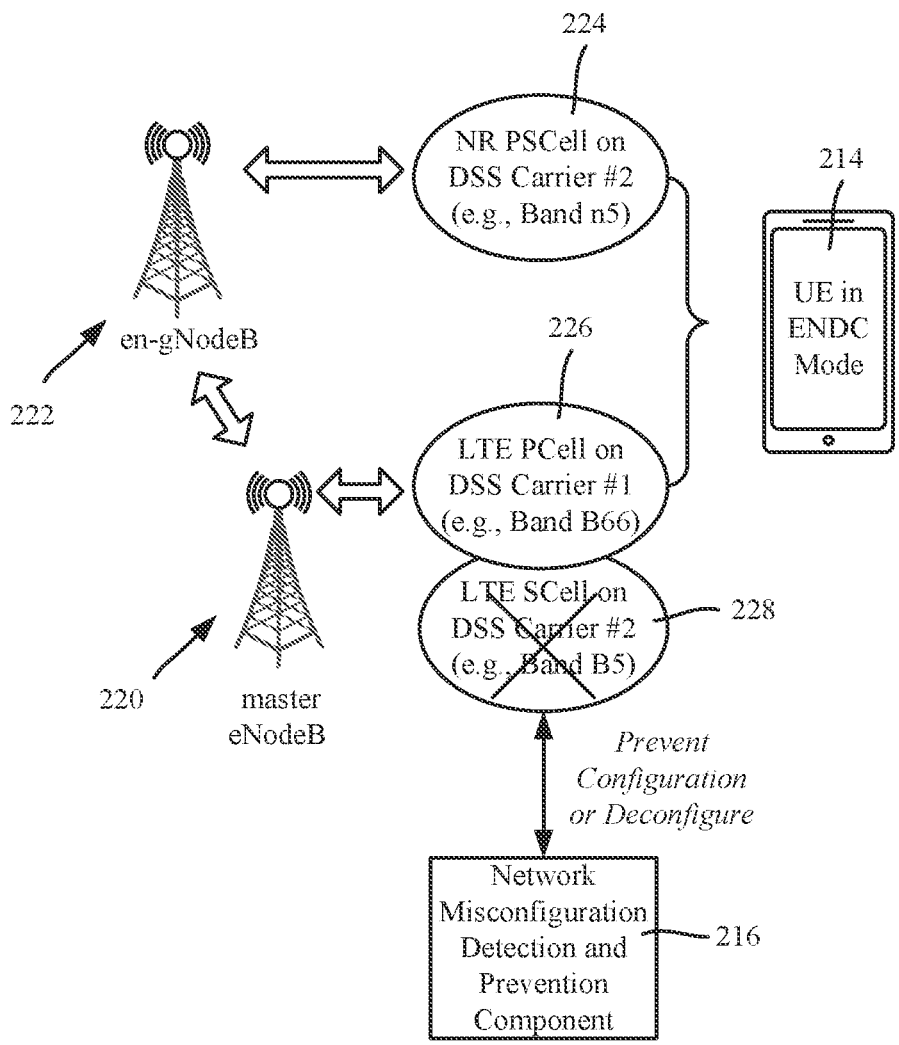
FIG. 2 is a block diagram illustrating an example network communication system in which a network detects and blocks a dynamic spectrum sharing misconfiguration scenario, in accordance with various aspects and embodiments of the subject disclosure.

FIG. 2 shows an example of a network based solution in which the network (via a network misconfiguration detection and prevention component 216) will block adding of the DSS cell to allowed LTE CA band combinations when the DSS cell is used as NR PSCell. In this example, a UE 214 is operating in the ENDC mode, in which the 4G LTE eNodeB is a master node (MeNB) 220 that controls the radio connection with the UE; the en-gNB 222 is used as a secondary node.

In the event that the LTE DSS cell was already misconfigured in this way before ENDC establishment on the device 214, because the LTE DSS SCell band is the same as NR PSCell band, the LTE DSS SCell is deconfigured during ENDC setup, and is blacklisted from the LTE CA list until the NR PSCell is released.

Thus, in the example of FIG. 2, the NR PSCell on DSS Carrier #2 (e.g., band n5) represented by block 224 and the LTE SCell also on DSS Carrier #2 (e.g., band B5) represented by block 228 can cause the aforementioned problems. As such, the misconfiguration detection and prevention component 216, as implemented by the network, operates to block such a configuration, or if already configured before ENDC establishment on the device 214, to deconfigure the configuration.

Figure 3:
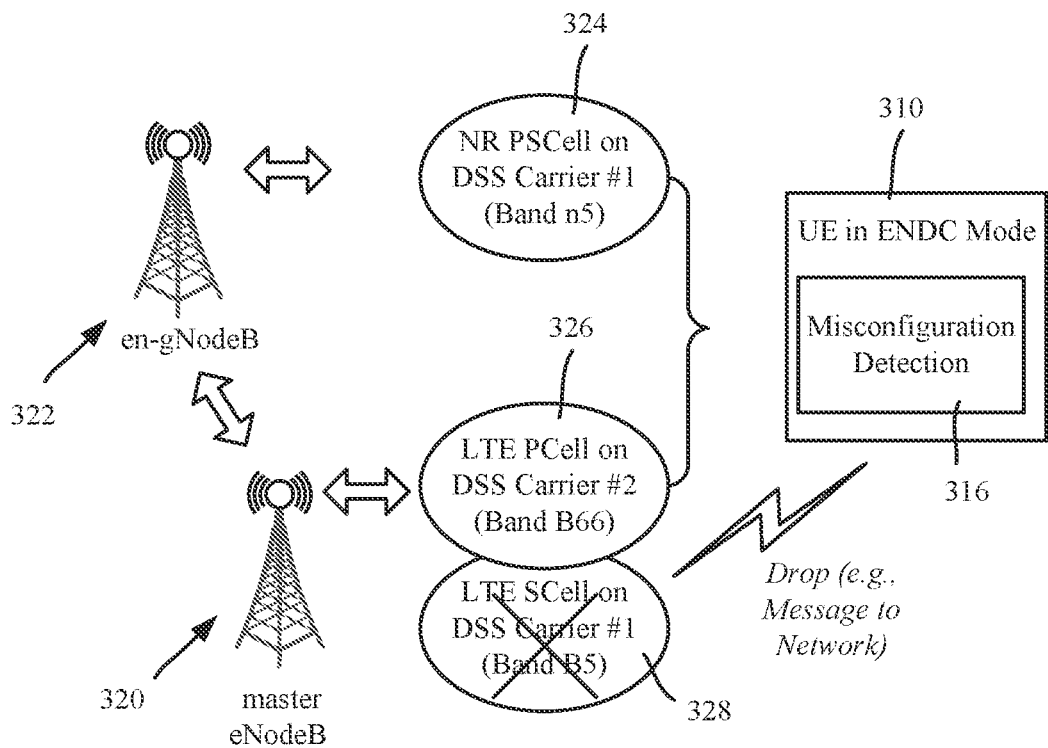
FIG. 3 is a block diagram illustrating an example network communication system in which user equipment/a mobile device detects and terminates usage of a misconfigured dynamic spectrum sharing cell, in accordance with various aspects and embodiments of the subject disclosure.

FIG. 3 depicts a user equipment based solution, in which misconfiguration detection logic 316 is incorporated into user equipment 310 capable of operating in the ENDC mode. When the network sends the DSS LTE and 5G data concurrently to the same UE, and they carry the same primary cell identifier, the UE knows it came from the same frequency band and to choose one to configure and drop the other one, instead of configuring both. Consider that as in FIG. 3, band B5 is deployed as frequency carrier #1 (block 324), and NR PSCell from band B5 is also deployed on frequency carrier #1 (block 328). The misconfiguration detection logic 316 on the UE device detects the issue, and the device 310 can choose to drop LTE carrier #1 band 5, such as by sending an LTE B5 radio link failure message to the network, which will drop the LTE carrier whereby the issue is remedied. Alternatively the device 310 can instead choose to drop NR carrier #1 NR band n5, such as by sending an n5 radio link failure to the network, that is, secondary cell group failure.

It should be noted that in contrast, consider that the network instead configured the ENDC band combination a UE multi-radio dual connectivity band combination in which the LTE DSS cell shares the same band as the NR PSCell, in which their frequencies are different. For example, B66-B5-n5. There are no issues if the LTE carrier from B5 is deployed on frequency carrier #1, while the NR PSCell from band 5 is deployed on frequency carrier #2.

Figure 4:
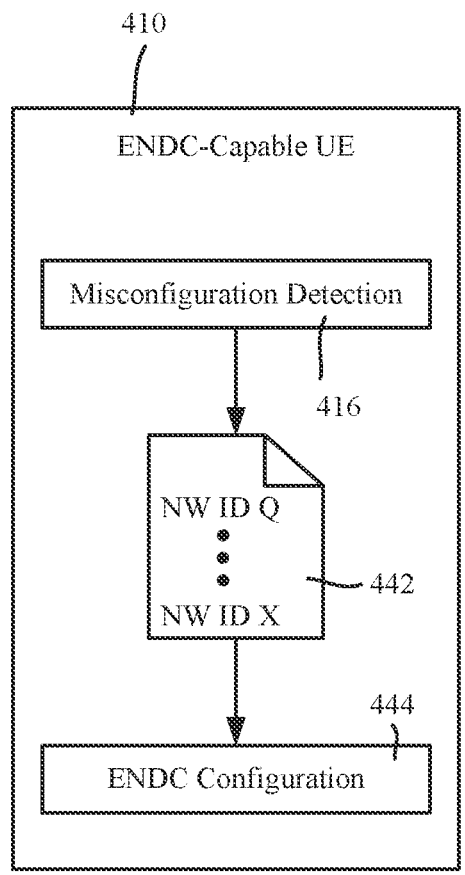
FIG. 4 is an example block diagram of a user equipment saving information related to a dynamic spectrum sharing misconfiguration scenario, in accordance with various aspects and embodiments of the subject disclosure.

FIG. 4 shows a situation in which in a DSS NR cell coverage region, trained AI models, logic or the like can fingerprint the network ID of misconfigured cells. Such an AI model can let the network and a device intelligently adjust band combinations to avoid misconfigurations. For example, if learned by/communicated to an ENDC-capable UE 410, whether directly by internal misconfiguration detection logic 416 or indirectly from another source, a data structure (e.g., list) 442 of such network IDs can be used to proactively avoid the problematic DSS cell combinations. Such a list 442 can be used to basically geo-fence certain coverage ranges, putting the LTE DSS carrier in LTE CA as low priority, (e.g., via ENDC configuration logic 444 in the ENDC capable device 410).

Figure 5:
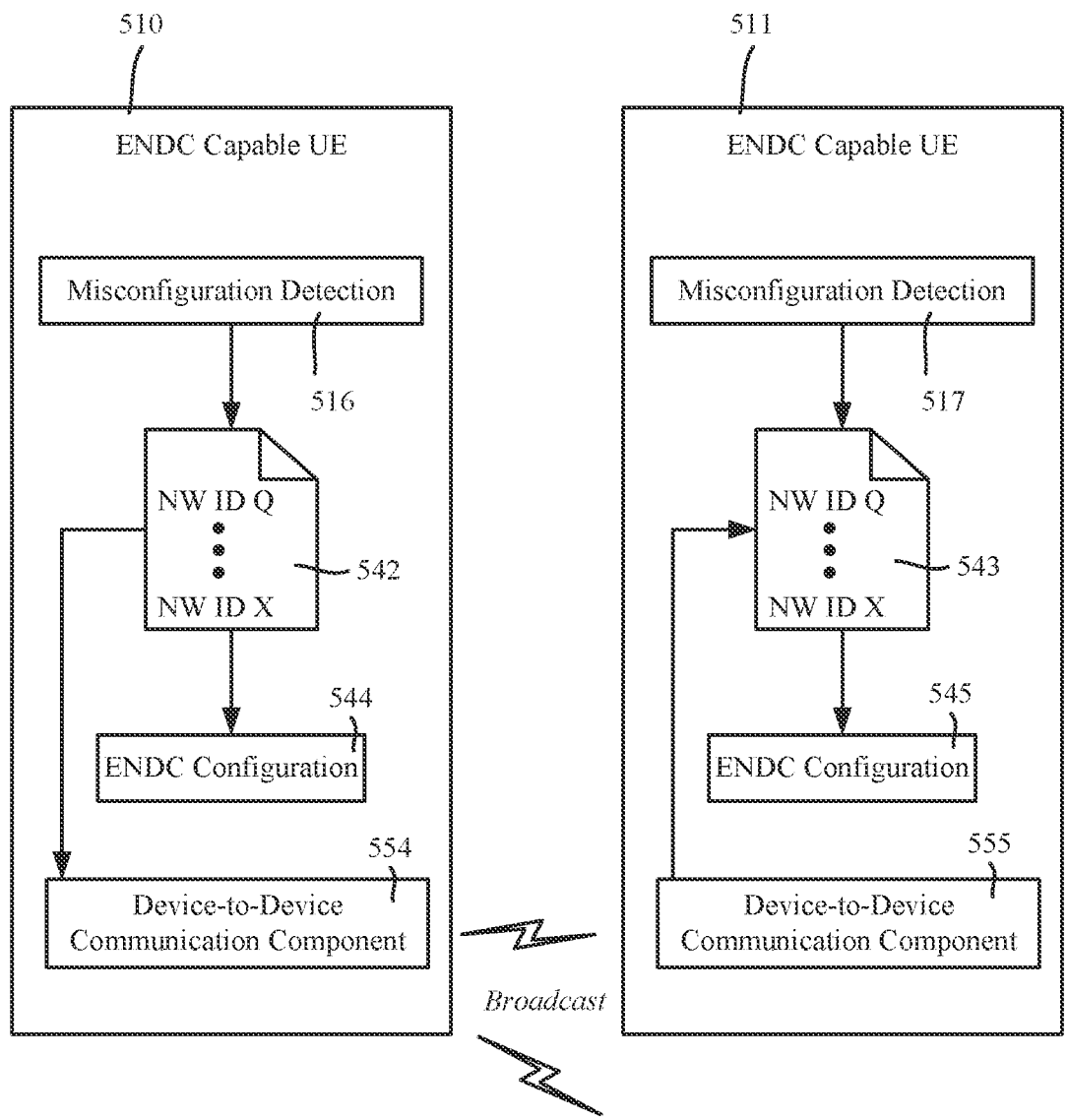
FIG. 5 is an example block diagram of a user equipment sharing information related to a dynamic spectrum sharing misconfiguration scenario, in accordance with various aspects and embodiments of the subject disclosure.

FIG. 5 shows another alternative in which a first ENDC capable device 510 broadcasts its misconfiguration information, such as all or part (e.g., one or more nearby cells only) of its data structure 542, to a second ENDC capable device 511. Such a communication can be via device-to-device communication (e.g., sidelink) as exemplified by example components 554 and 555, such as to a different device approaching a misconfigured coverage area. Such a communication can also be through the network.

Figure 6A:
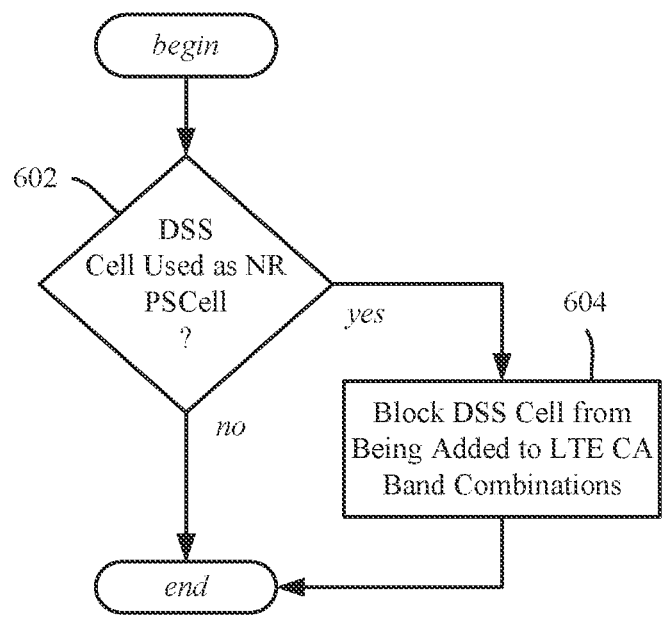
FIG. 6A is a flow diagram representing example operations of a network to block usage of a misconfigured dynamic spectrum configuration, in accordance with various aspects and embodiments of the subject disclosure.

FIG. 6A summarizes the network solution, in a scenario before the LTE DSS cell has not been configured. As can be seen via operations 602 and 604, the network blocks the DSS cell from being added to LTE CA band combinations when the DSS cell is used as NR PSCell.

Figure 6B:
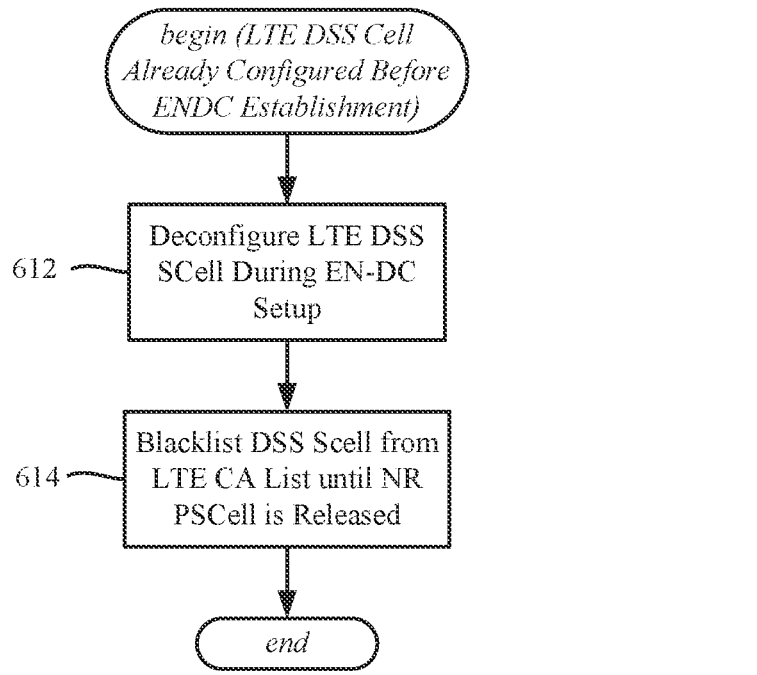
FIG. 6B is a flow diagram representing example operations of a network to deconfigure (and block usage of) a misconfigured dynamic spectrum configuration, in accordance with various aspects and embodiments of the subject disclosure

FIG. 6B summarizes the network solution, in a scenario in which such an LTE DSS cell was already configured before ENDC establishment on the device. As seen via operations 612 and 614, when the LTE DSS SCell band is the same as the NR PSCell band, the LTE DSS SCell is deconfigured during ENDC setup (operation 612) and blacklisted (operation 614) from the LTE CA list until the NR PSCell is released.

Figure 7:
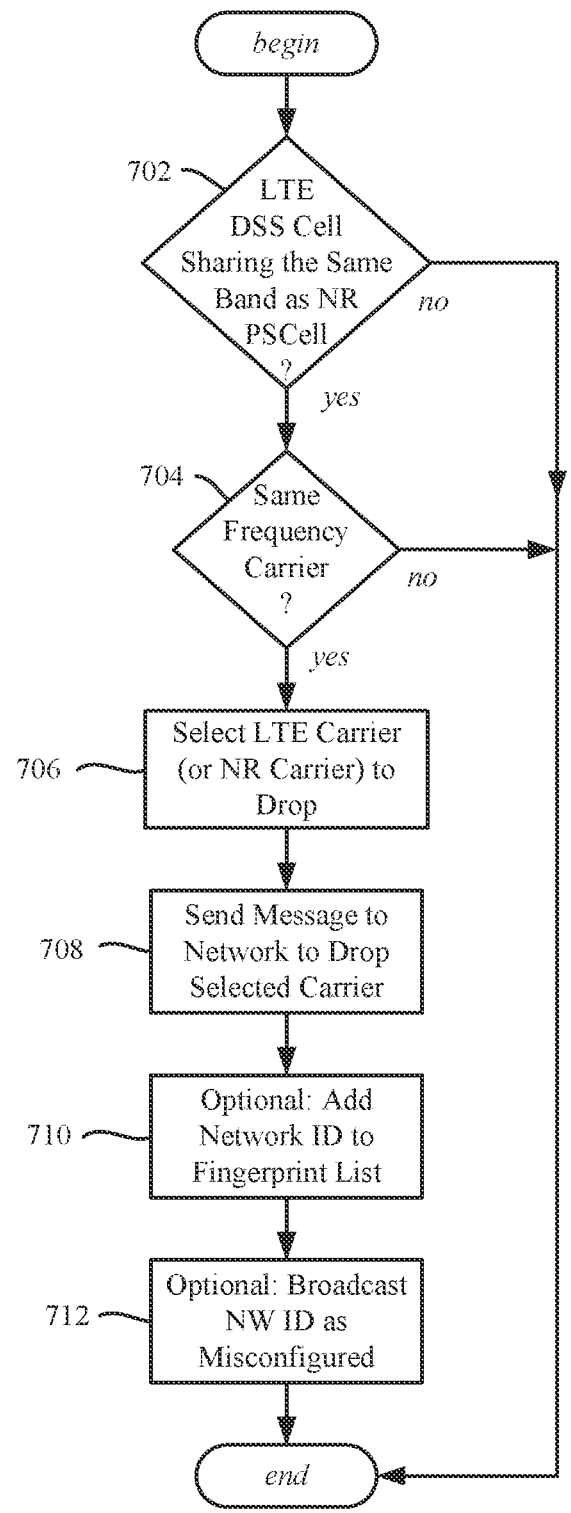
FIG. 7 is a flow diagram representing example operations of a user equipment to detect and terminate usage of a misconfigured dynamic spectrum sharing cell, in accordance with various aspects and embodiments of the subject disclosure.

FIG. 7 summarizes a UE based solution. If, as evaluated via operations 702 and 704, the network configures an ENDC band combination on an ENDC UE in which the LTE DSS cell shares the same band as the NR PSCell and both are deployed on the same frequency carrier, operation 706 selects either the LTE carrier or the NR carrier. Operation 708 sends a message to the network to drop the selected carrier.

Note that the drop can be accomplished by sending a radio link failure message to the network for the selected carrier. However, instead of or in addition to a radio link failure message, it is also feasible to send a more customized message to the network, e.g., a misconfiguration message that when received by the network, identifies the misconfiguration problem. This allows the network to drop the UE's selected carrier (if not separately done via a radio link failure message) as well as flag the misconfiguration problem as needing correction.

Operation 710 represents the UE (optionally) recording the network ID/fingerprint so that the issue can be proactively avoided by the UE in the future. Operation 712 represents the UE (optionally) broadcasting the network ID, e.g., via sidelink to nearby devices, and/or to the network.

It should be noted that the network can fix a misconfiguration, whereby a stored "fingerprint" is no longer apt. To remove the fingerprint, it can expire based on some criterion (e.g., time and date, number of times used, or the like) so that the UE will occasionally try to see if the misconfiguration was resolved. Such a fix can be broadcast by the network, or between mobile devices.

Figure 8:
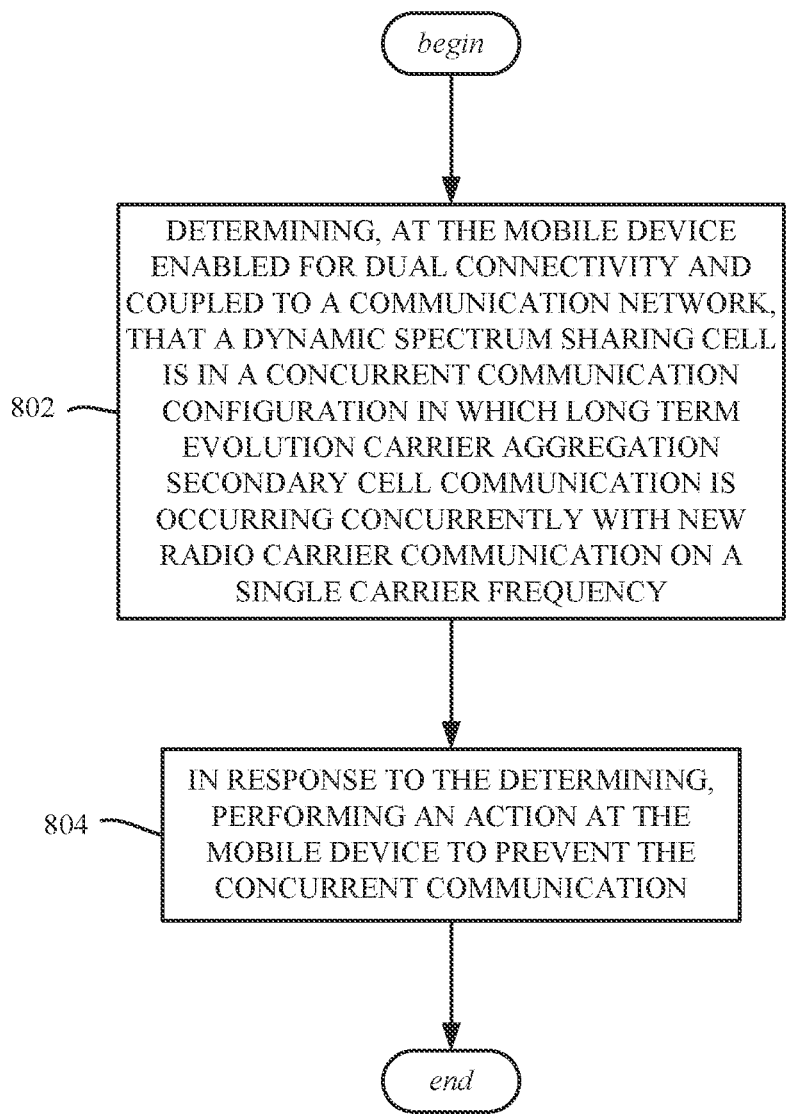
FIG. 8 is a flow diagram representing example operations of a mobile device to determine a misconfigured dynamic spectrum sharing cell and take action to prevent usage thereof, in accordance with various aspects and embodiments of the subject disclosure.

One or more example aspects are represented in FIG. 8, and can correspond to a mobile device, comprising a processor, and a memory that stores executable instructions that, when executed by the processor, facilitate performance of operations. Example operation 802 represents determining, at the mobile device enabled for dual connectivity and coupled to a communication network, that a dynamic spectrum sharing cell is in a concurrent communication configuration in which long term evolution carrier aggregation secondary cell communication is occurring concurrently with new radio carrier communication on a single carrier frequency. Operation 804 represents, in response to the determining, performing an action at the mobile device to prevent the concurrent communication.

Performing the action at the mobile device to prevent the concurrent communication can include terminating usage of a long term evolution carrier associated with the long term evolution carrier aggregation secondary cell communication. Terminating the usage of the long term evolution carrier can include sending a long term evolution radio link failure message to network equipment of the communication network. Terminating the usage of the long term evolution carrier can include sending a dynamic spectrum sharing cell misconfiguration message to network equipment of the communication network.

Performing the action at the mobile device to prevent the concurrent communication can include terminating usage of a new radio carrier associated with the new radio carrier communication. Terminating the usage of the new radio carrier can include sending a secondary cell group radio link failure message to the wireless network. Dropping the new radio carrier can include sending a dynamic spectrum sharing cell misconfiguration message to network equipment of the communication network.

Further operations can include storing, in storage accessible to the mobile device, an identifier of the dynamic spectrum sharing cell.

The mobile device can be a first mobile device, and further operations can include sending a dynamic spectrum sharing cell misconfiguration message to a second mobile device.

The mobile device can be a first mobile device, and wherein the further operations can include sending, from the first mobile device, a dynamic spectrum sharing cell misconfiguration message to a second mobile device. Sending can include communicating the dynamic spectrum sharing cell misconfiguration message to the second mobile device via direct device-to-device communication.

Figure 9:
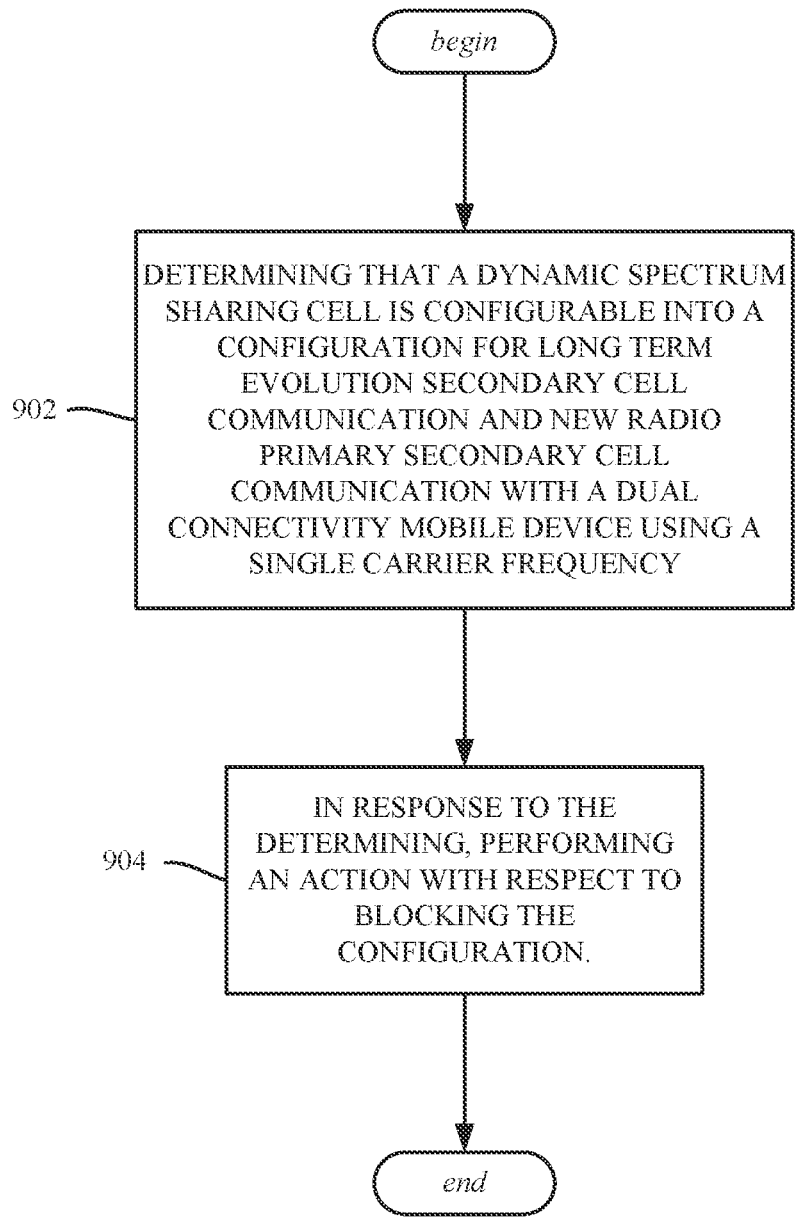
FIG. 9 is a flow diagram representing example operations of network equipment to determine a misconfigured dynamic spectrum sharing cell and take action to prevent usage thereof, in accordance with various aspects and embodiments of the subject disclosure.

One or more example aspects are represented in FIG. 9, and can correspond to network equipment comprising a processor, and a memory that stores executable instructions that, when executed by the processor, facilitate performance of operations. Example operation 902 represents determining that a dynamic spectrum sharing cell is configurable into a configuration for long term evolution secondary cell communication and new radio primary secondary cell communication with a dual connectivity mobile device using a single carrier frequency. Operation 904 represents, in response to the determining, performing an action with respect to blocking the configuration.

Determining that the dynamic spectrum sharing cell is configurable into the configuration can include determining that the cell is already configured according to a long term evolution configuration of the long term evolution secondary cell, and performing the action with respect to blocking the configuration can include deconfiguring the long term evolution configuration of the long term evolution secondary cell. Deconfiguring the long term evolution configuration of the long term evolution secondary cell can be performed during dual connectivity setup of the dual connectivity mobile device. Further operations can include excluding the long term evolution secondary cell for usage by the dual connectivity mobile device until the new radio primary secondary cell is released by the dual connectivity mobile device.

Determining that the dynamic spectrum sharing cell is configurable into the configuration can include determining that the cell is to be configured into the configuration, and wherein performing the action with respect to blocking the configuration can include preventing the configuration of the long term evolution secondary cell from being applied.

Figure 10:
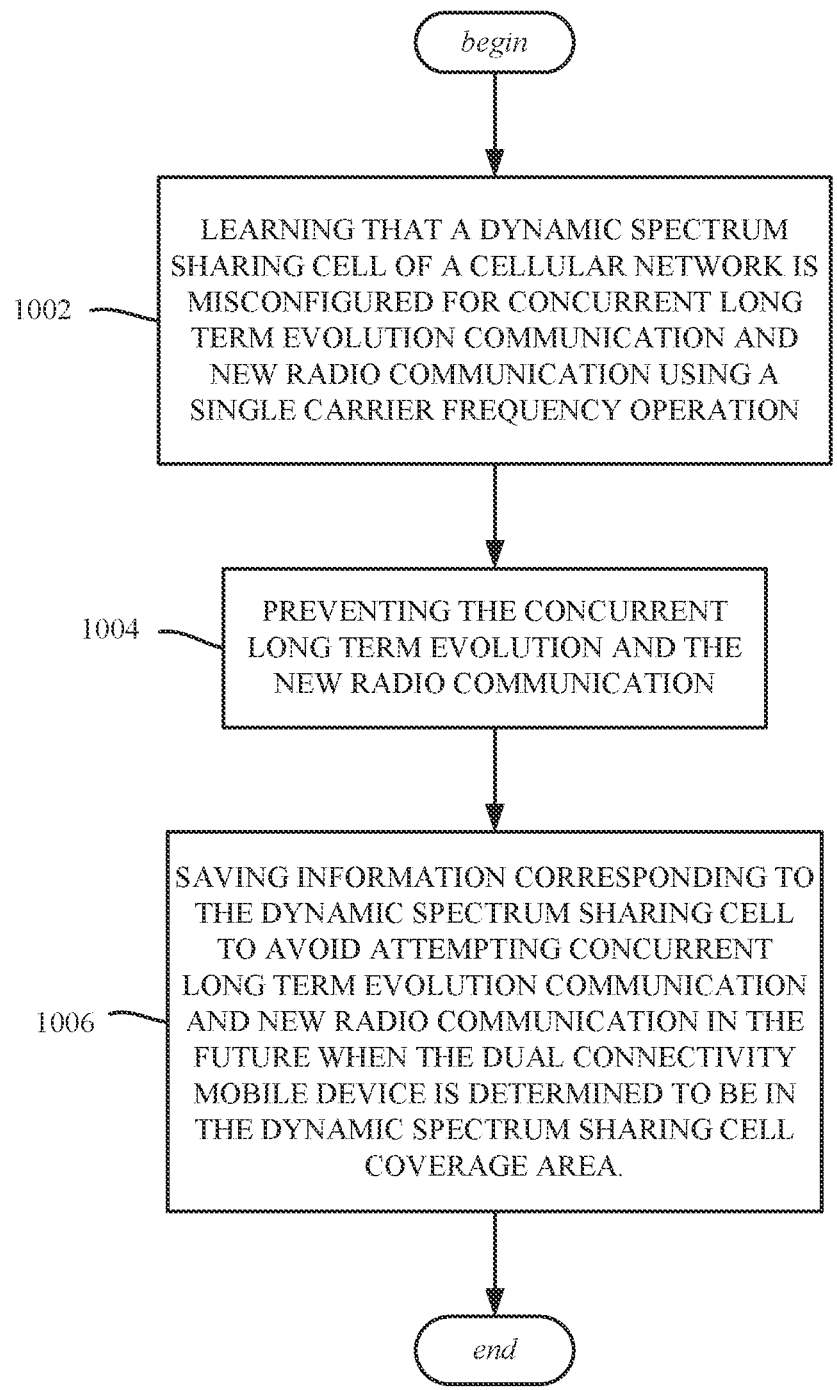
FIG. 10 is a flow diagram representing example operations of a mobile device to determine a misconfigured dynamic spectrum sharing cell, take action to prevent its usage, and save information related to the misconfiguration, in accordance with various aspects and embodiments of the subject disclosure.

One or more aspects are represented in FIG. 10, such as implemented in a machine-readable medium, comprising executable instructions that, when executed by a processor, facilitate performance of operations. Example operation 1002 represents learning that a dynamic spectrum sharing cell of a cellular network is misconfigured for concurrent long term evolution communication and new radio communication using a single carrier frequency. Operation 1004 represents preventing the concurrent long term evolution and the new radio communication. Operation 1006 represents saving information corresponding to the dynamic spectrum sharing cell to avoid attempting concurrent long term evolution communication and new radio communication in the future when the dual connectivity mobile device is determined to be in the dynamic spectrum sharing cell coverage area.

The dual connectivity mobile device can be a first mobile device, and further operations can include communicating the information to a second mobile device.

Preventing of the concurrent long term evolution communication and the new radio communication can include communicating with the cellular network to cease the long term evolution communication.

Further operations can include detecting an identifier corresponding to the dynamic spectrum sharing cell in response to reentering the dynamic spectrum sharing cell coverage area, and accessing the information to determine that the dynamic spectrum sharing cell is misconfigured.

As can be seen, the technology described herein provides for avoiding configuring the same DSS carrier concurrently as LTE carrier and NR PSCell carrier for a UE. As the Third Generation Partnership Project (3GPP) standards do not give guidance on using a DSS carrier concurrently as an LTE SCell and PSCell for NR in a 5G NSA UE, the technology described herein overcomes that standards gap.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-1-DMA), orthogonal frequency division multiplexing (01-DM), discrete Fourier transform spread 01-DM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word 01-DM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
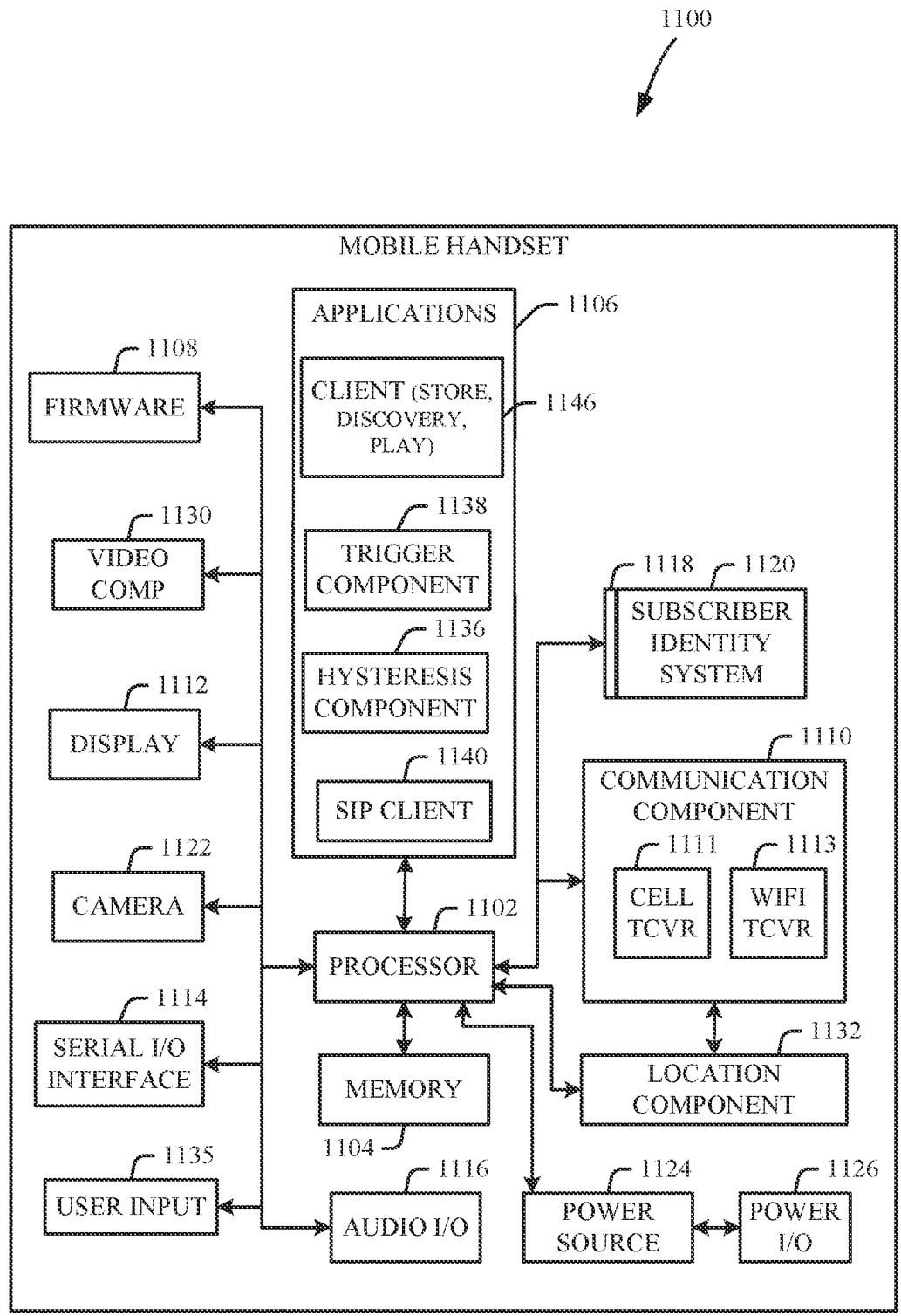
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device (such as user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
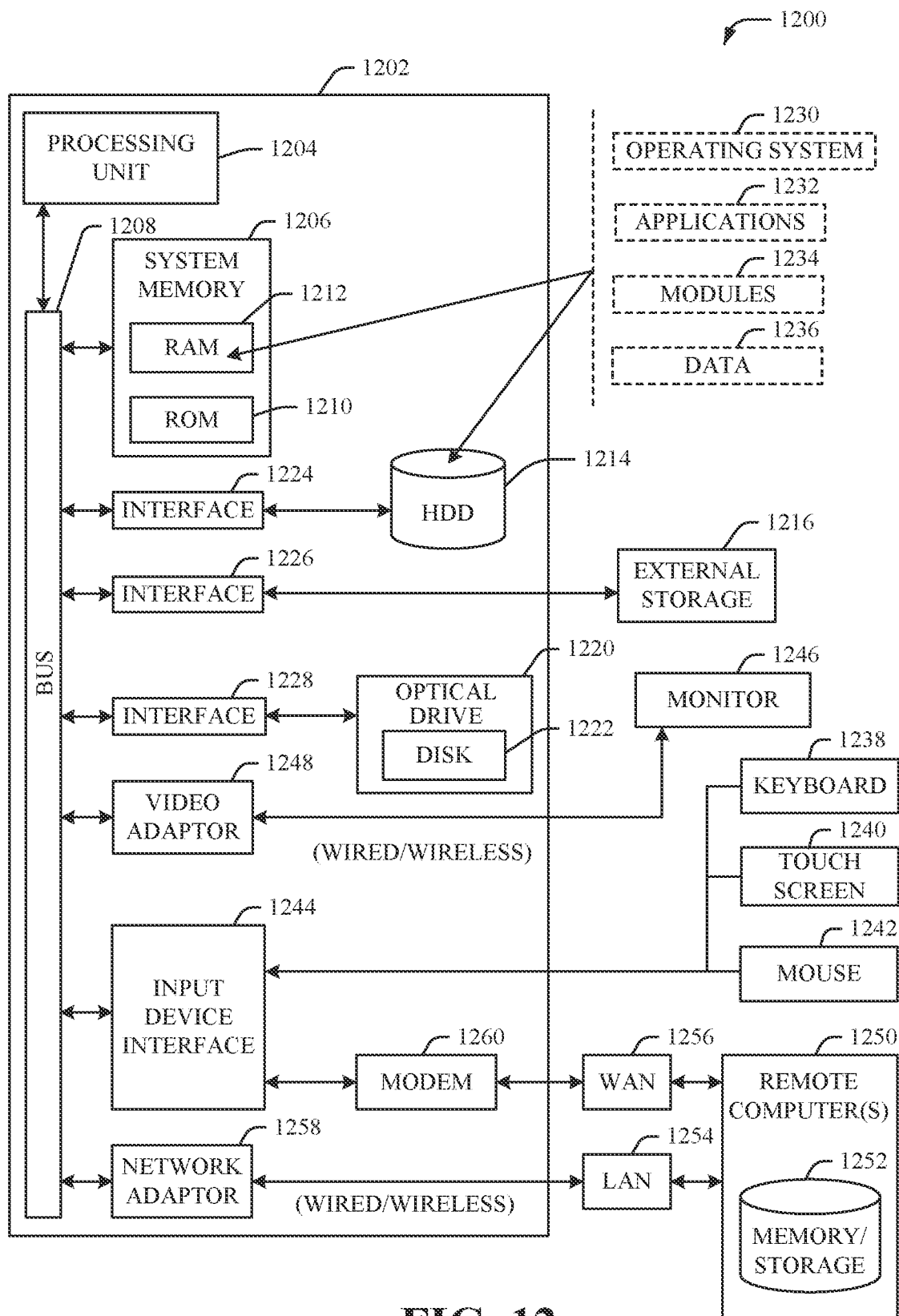
FIG. 12 illustrates an example block diagram of an example computer/machine system operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A first mobile device, comprising:
a processor; and
a memory that stores executable instructions which, when executed by the processor of the first mobile device, facilitate performance of operations, the operations comprising:
   determining whether first dynamic spectrum sharing data corresponding to a long term evolution secondary cell of a communication network and second dynamic spectrum sharing data corresponding to a new radio primary secondary cell of the communication network have been concurrently received by the first mobile device via a frequency carrier;
   in response to the first dynamic spectrum sharing data and the second dynamic spectrum sharing data being determined to have been concurrently received by the first mobile device via the frequency carrier, performing an action to prevent a future reception, via the frequency carrier, of one of: the first dynamic spectrum sharing data or the second dynamic spectrum sharing data by the first mobile device; and
   sending a first dynamic spectrum sharing cell misconfiguration message to a second mobile device, wherein the first dynamic spectrum sharing cell misconfiguration message causes the communication network to drop the one of: the first dynamic spectrum sharing data or the second dynamic spectrum sharing data and to record, in a storage accessible to the first mobile device, a network identifier of the long term evolution secondary cell to avoid, based on the identifier, the future reception of the first dynamic spectrum sharing data by the first mobile device.

2. The first mobile device of claim 1, wherein the performing the action comprises terminating a usage of a long term evolution carrier associated with the long term evolution secondary cell.

3. The first mobile device of claim 2, wherein the terminating the usage of the long term evolution carrier comprises sending a long term evolution radio link failure message to network equipment of the communication network.

4. The first mobile device of claim 2, wherein the terminating the usage of the long term evolution carrier comprises sending a second dynamic spectrum sharing cell misconfiguration message to network equipment of the communication network.

5. The first mobile device of claim 1, wherein the performing the action comprises terminating a usage of a new radio carrier associated with the new radio primary secondary cell.

6. The first mobile device of claim 5, wherein the terminating the usage of the new radio carrier comprises sending a secondary cell group radio link failure message to network equipment of the communication network.

7. The first mobile device of claim 5, wherein the terminating the usage of the new radio carrier comprises sending a second dynamic spectrum sharing cell misconfiguration message to network equipment of the communication network.

8. The first mobile device of claim 1, wherein the sending comprises:
communicating the first dynamic spectrum sharing cell misconfiguration message to the second mobile device via direct device-to-device communication.

9. The first mobile device of claim 1, further comprising:
broadcasting the identifier of the long term evolution secondary cell to a third mobile device.

10. Network equipment, comprising:
a processor; and
a memory that stores executable instructions which, when executed by the processor of the network equipment, facilitate performance of operations, the operations comprising:
   receiving, from a dual connectivity mobile device, a dynamic spectrum sharing cell misconfiguration message;
   determining, in response to the receiving, that a long term evolution secondary cell of a communication network has been configured for a concurrent communication, via a carrier frequency, with the dual connectivity mobile device;
   determining, in response to the receiving, that a new radio primary secondary cell of the communication network has been configured for the concurrent communication with the dual connectivity mobile device;

determining, in response to the receiving, that the dual connectivity mobile device has recorded, in a storage accessible to the dual connectivity mobile device, a network identifier of the long term evolution secondary cell to avoid, based on the identifier, a future reception of the concurrent communication by the dual connectivity mobile device; and in response to the determining that the long term evolution secondary cell and the new radio primary secondary cell have been configured for the concurrent communication, performing an action with respect to blocking a reception by the dual connectivity mobile device of dynamic spectrum sharing data corresponding to one of: the long term evolution secondary cell or the new radio primary secondary cell based on an indication in the dynamic spectrum sharing cell misconfiguration message that the dual connectivity mobile device has dropped the dynamic spectrum sharing data.

11. The network equipment of claim 10, wherein the blocking the reception of the concurrent communication by the dual connectivity mobile device comprises: deconfiguring the long term evolution secondary cell in response to an indication in the dynamic spectrum sharing cell misconfiguration message.

12. The network equipment of claim 11, wherein the deconfiguring the long term evolution secondary cell is performed during a dual connectivity setup of the dual connectivity mobile device.

13. The network equipment of claim 11, wherein the blocking the reception of the concurrent communication by the dual connectivity mobile device comprises:

excluding the long term evolution secondary cell for usage by the dual connectivity mobile device until the new radio primary secondary cell is released by the dual connectivity mobile device.

14. The network equipment of claim 10, wherein the blocking the reception of the concurrent communication by the dual connectivity mobile device comprises:

preventing the long term evolution secondary cell from being utilized in concurrent communications comprising the concurrent communication corresponding to respective carrier frequencies comprising the carrier frequency.

15. The first mobile device of claim 10, wherein the second mobile device is a dual connectivity mobile device.

16. A non-transitory machine-readable medium, comprising executable instructions that, when executed by a processor of a first mobile device that is a dual connectivity mobile device, facilitate performance of operations of the processor, the operations comprising:

determining that a long term evolution secondary cell of a cellular network and a new radio primary secondary cell of the cellular network have been misconfigured for a concurrent communication using a single carrier frequency;

in response to the determining that the long term evolution secondary cell and the new radio primary secondary cell have been misconfigured, storing, in a data storage device of the dual connectivity mobile device, an identifier representing the long term evolution secondary cell;

in response to detecting that the dual connectivity mobile device has left and subsequently re-entered a wireless coverage area of the long term evolution secondary cell, determining, based on the identifier that is stored, that a reception of the concurrent communication by the dual connectivity mobile device should be prevented while the dual connectivity mobile device remains within the wireless coverage area of the long term evolution secondary cell; and;

and communicating, to a second mobile device, a dynamic spectrum sharing cell misconfiguration message that indicates that the long term evolution secondary cell and the new radio primary secondary cell have been misconfigured for the concurrent communication using the single carrier frequency, that the first mobile device has dropped dynamic spectrum sharing data corresponding to one of: the long term evolution secondary cell or the new radio primary secondary cell, and that the identifier has been recorded by the first mobile device to avoid the reception of the dynamic spectrum sharing data by the first mobile device while the first mobile device remains within the wireless coverage area of the long term evolution secondary cell.

17. The non-transitory machine-readable medium of claim 16, wherein the determining that the long term evolution secondary cell and the new radio primary secondary cell have been misconfigured comprises:

communicating with network equipment of the cellular network to cease a long term evolution communication of the long term evolution secondary cell.

18. The non-transitory machine-readable medium of claim 16, wherein the operations further comprise:

in response to entering the wireless coverage area of the long term evolution secondary cell, determining whether the identifier has been stored in the data storage device.

19. The non-transitory machine-readable medium of claim 16, wherein the second mobile device is a dual connectivity mobile device.

* * * * *